United States Patent [19]
Webb

[11] Patent Number: 5,870,420
[45] Date of Patent: Feb. 9, 1999

[54] CROSS-FLOW BLOWER WITH BRACES

[75] Inventor: R. Kyle Webb, Escondido, Calif.

[73] Assignee: Cymer, Inc., San Diego, Calif.

[21] Appl. No.: 912,737

[22] Filed: Aug. 18, 1997

[51] Int. Cl.⁶ .............................. H01S 3/097; H01S 3/22; F04D 29/28
[52] U.S. Cl. .............................. 372/58; 416/178; 416/187
[58] Field of Search ........................ 372/58, 57; 416/178, 416/187; 415/53.1, 53.2, 53.3

[56] References Cited

U.S. PATENT DOCUMENTS

| | | | |
|---|---|---|---|
| 691,609 | 1/1902 | Davidson | 416/187 |
| 1,378,003 | 5/1921 | Candee | 416/187 |
| 1,652,285 | 12/1927 | McMurdie | 416/178 |
| 3,130,899 | 4/1964 | Brown et al. | 416/187 |
| 5,023,884 | 6/1991 | Akins et al. | 372/57 |
| 5,611,667 | 3/1997 | Nagamori et al. | 416/178 |

OTHER PUBLICATIONS

Eck, Bruno, Dr.–Ing., "Fans Design and Operation of Centrifugal, Axial–Flow and Cross–Blow Fans", pp. 156–184, No date, Pergamon Press.

*Primary Examiner*—James W. Davie
*Attorney, Agent, or Firm*—John R. Ross, Esq.

[57] ABSTRACT

A trussed cross-flow blower comprising truss elements on the inside of a cylindrically-shaped cross-flow blower element form at least three trusses which provide rigidity to the blower element. Preferably three trusses are provided, and they are located at radial 120° spacings.

7 Claims, 2 Drawing Sheets

CROSS-FLOW BLOWER WITH BRACES

BACKGROUND OF THE INVENTION

Cross-flow blowers, sometimes called tangential blowers, or squirrel cage blowers, have been known for more than 100 years. FIG. 2 is an 1892 sketch of such a blower by Mortier. These blowers have a generally hollow cylindrical shape with a large number of blades located at the circumference. They were used extensively for mine ventilation in the early 1900s, but were soon replaced in the mines by blowers of other design. Interest in cross-flow blowers increased in the mid-1900s, and the blowers have been used in many applications in recent years. Cross-flow blowers are most often chosen when high flow, low head circulation is needed.

A prior art application of cross-flow blowers is to circulate the gas gain medium between two elongated electrodes in excimer lasers. An example of this use is described in U.S. Pat. No. 5,023,884 assigned to the Applicant's employer. This laser is useful as the light source in laser lithography equipment used in integrated circuit fabrication. As indicated in FIG. 1 (also FIG. 1 in the '884 patent), the laser gas is circulated through a discharge region 22 between two elongated spaced apart electrodes 18 and 20. The discharge region is about 5/8 inch and 28 inches long. The gas circulation is provided by a cross-flow blower 46 which is about 4 inches in diameter and about 28 inches long.

These excimer lasers have, in the past, operated in a pulse mode at rates of up to 1,000 Hz. A pulse rate of 1,000 Hz requires a flow rate of gas between the electrodes of at least about 2,000 cm/second in order to assure that "old gas" from one pulse is cleared from the discharge region before the beginning of the next pulse. Gas speeds of about 2,000 cm/second requires a fan speed of about 3,300 rpm. At speeds greater than 3,300 rpm, the long skinny fan develops vibrational modes that lead to rapid bearing failure and sometimes sufficient distortion to damage the structural elements of the fan itself.

Efforts have been made to make the fan more rigid. These efforts include improved manufacturing processes and the use of materials having increased strength. To the best of Applicant's knowledge, all prior art efforts to strengthen these blowers have left the inside of the blower hollow. This may have been the result of a prior art assumption that hollow insides are required for proper functioning of cross-flow blowers.

SUMMARY OF THE INVENTION

The present invention provides a trussed cross-flow blower. Truss elements on the inside of a cylindrically-shaped cross-flow blower element form at least three trusses which provide rigidity to the blower element. Preferably three trusses are provided, and they are located at 120° radial spacings.

DETAILED DESCRIPTION OF PREFERRED EMBODIMENTS

Figure 1:
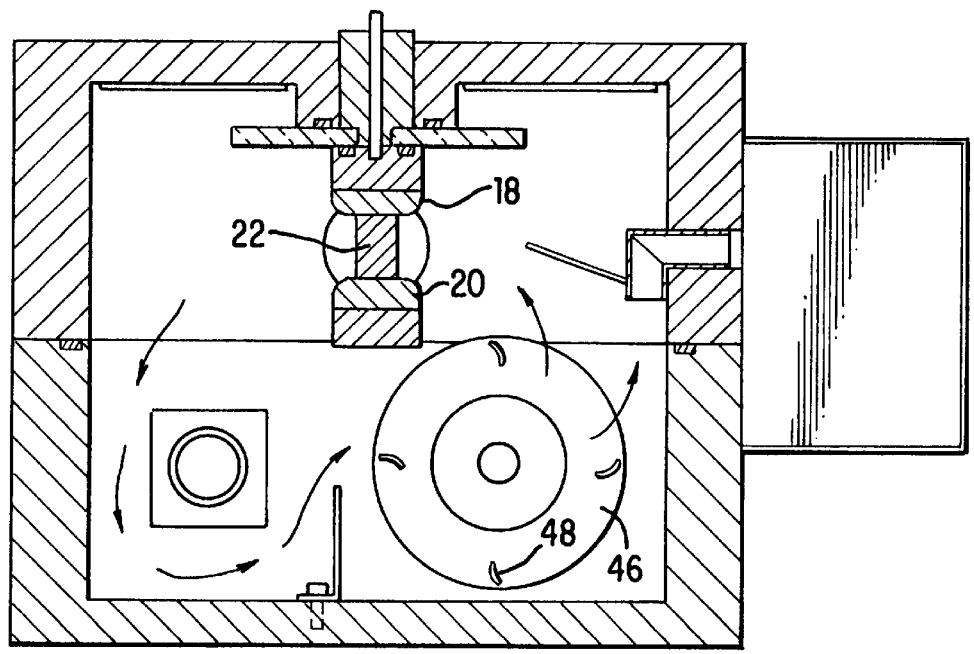
FIG. 1 is a prior art drawing of an excimer laser showing a prior art cross-flow blower.
Figure 2:
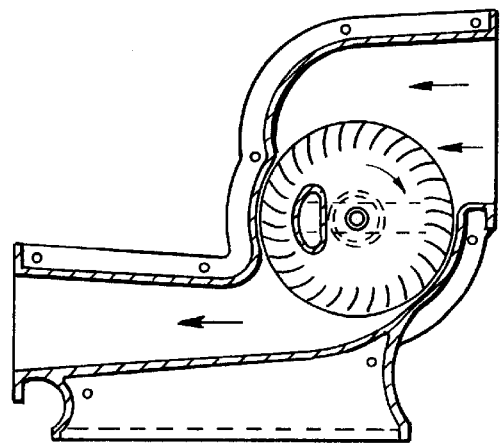
FIG. 2 is an 1892 sketch of a cross-flow blower.
Figure 3A:
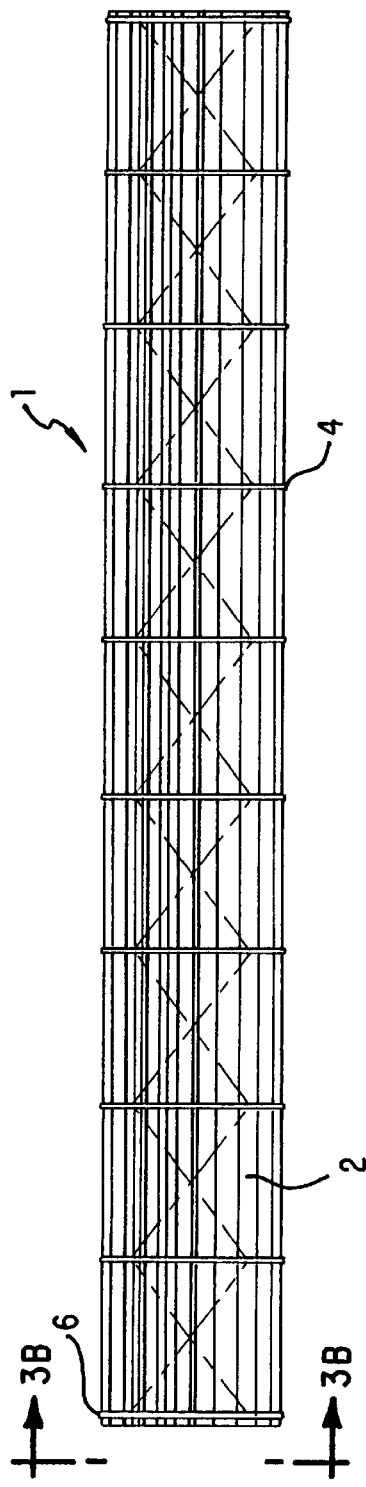
FIGS. 3A, 3B and 3C are three drawings of a preferred embodiment of the present invention.
Figure 3C:
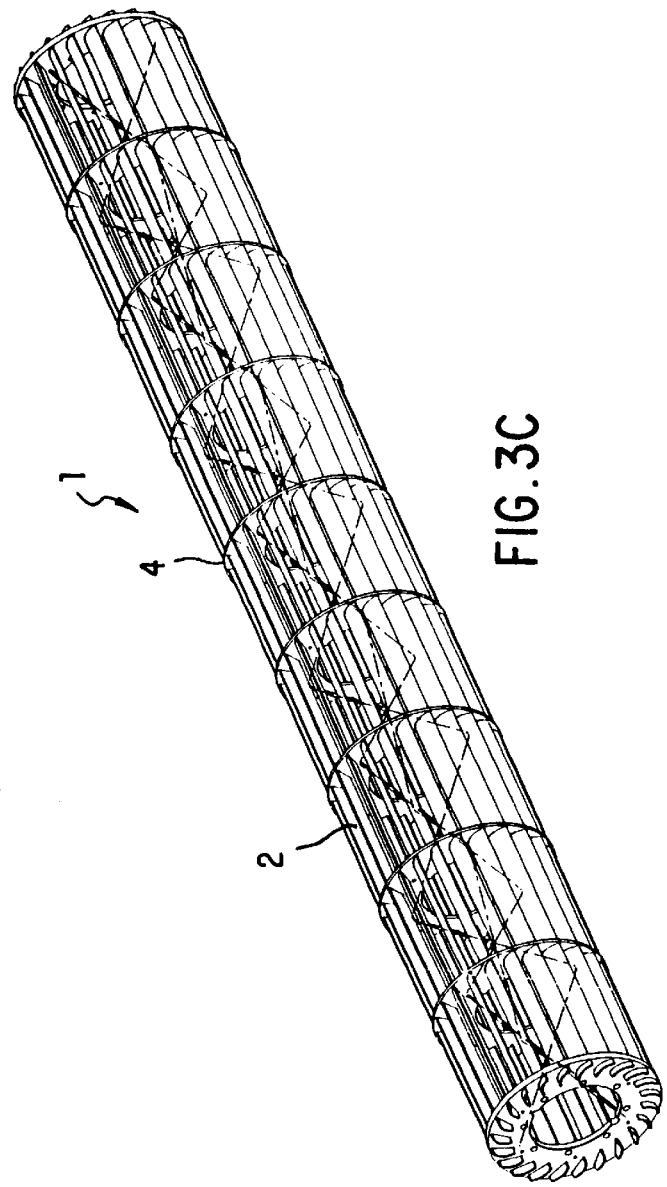
Figure 3B:
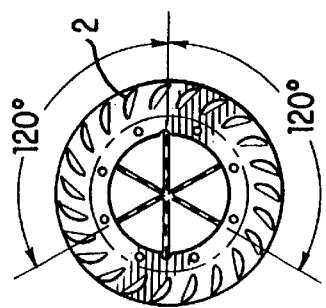

FIGS. 3A, 3B and 3C describe the blower element 1 of a preferred embodiment of the present invention. This particular blower element is a modified prior art blower element used to circulate gas in an excimer laser. The modifications consist of the addition of three sets of truss members installed internally to the blower element. The principal components of the prior art blower element are twenty-three 26-inch long blades 2 equally spaced around the circumference of the blower element. The blades have a radius of curvature of about 0.35 inch and in their curved condition are about 0.45 inch wide. These blades are held in place by 10 equally spaced frame members 4. Two end frame members 6 are 1/8 inch thick and the eight internal frame members are 1/16 inch thick. At least one of the end frame members comprise mounting holes for attaching a motor drive unit.

The blades and the frame members are comprised of nickel plated 6061 aluminum with a T6 temper. All joints are welded joints.

The improvement which distinguishes this preferred embodiment from the prior art is twenty-seven truss elements 6 comprised of 1/10 inch diameter nickel coated aluminum rods which have been welded in place as shown in FIGS. 3A, 3B and 3C to form three trusses spaced radially at 120° intervals within the blower element. Each of the truss elements 6 extend from one point about 1/4 inch from the outside circumference of one frame member through the center axis of the blower element to an opposite similar point on an adjacent frame member.

Test Results

A prototype blower element was fabricated in accordance with the above description and tested against ten prior art blower elements not having the truss elements. Applicant's expectation (based on Applicant's study and understanding of prior art cross-flow blower technology) was that the braces would result in some substantial reduction in flow at equivalent fan rpm and some significant reduction in blower efficiency. Applicant's testing did reveal some slight reduction in efficiency (i.e., gas flow/motor current), but surprisingly the trussed blower element actually produced increases of a few percent in gas flow as compared to the prior art blower elements at equivalent blower speeds.

The results of Applicant's testing are shown in Table 1. Five of the prior art blower elements were of an older model, referred to by Applicant's fellow workers as a "soft fan" (designated in Table 1 as "s1 to s5") and five of the blowers were of a newer design referred to as a "hard fan" (designated in Table 1 as "h1 to h5"). The primary differences in these prior art fans is that the "hard" fans were fabricated from higher strength aluminum. The trussed blower element was a modified "hard fan."

The test data in Table 1 suggests that the present invention provides increased flow for the same fan speed but at some increase in current. For example, as compared to the average of the "hard" fans at 3300 rpm, the air velocity increased about 6% with a current increase of about 28% and at 3800 rpm the flow increased about 9% with a 27% increase in current.

Applications

The present invention is especially useful for providing gas flow in high pulse rate gas lasers such as excimer lasers. The invention is also applicable in many other situations requiring high speed rotation of a cross-flow blower, especially when the axial dimension of the blower element is longer than the diameter by more than a factor of five.

TABLE 1

Cross Braced Fan Flow Data

|  | air velocity 3300 rpm (ft/min) | air velocity 3800 rpm (ft/min) | air velocity 3300 rpm (m/s) | air velocity 3800 rpm (m/s) | Gap fan/anode (in) | Current 3300 rpm (amp) | Current 3800 rpm (amp) | pressure KrNe (Kpa) |
|---|---|---|---|---|---|---|---|---|
| crs brc ave 0.3048 m/ft 0.0167 min/s | 4549 | 5487 | 23.2 | 27.9 | 0.065 | 3.99 | 5.23 | 295.0 |
| current production fan flow data (5 hard fans) | | | | | | | | |
| h1 ave | 4166 | 4698 | 21.2 | 23.9 | 0.065 | 2.95 | 3.92 | 292.8 |
| h2 ave | 4127 | 4985 | 21.0 | 25.4 | 0.065 | 3.12 | 4.12 | 292.6 |
| h3 ave | 4354 | 5198 | 22.2 | 26.5 | 0.060 | 3.11 | 4.13 | 292.8 |
| h4 ave | 4290 | 4971 | 21.8 | 25.3 | 0.075 | 3.15 | 4.17 | 291.9 |
| h5 ave | 4449 | 5251 | 22.6 | 26.7 | 0.070 | 3.25 | 4.30 | 293.3 |
| h ave | 4277 | 5021 | 21.8 | 25.6 | 0.067 | 3.12 | 4.13 | 292.7 |
| current production fan flow data (5 soft fans) | | | | | | | | |
| s1 ave | 3994 | 5004 | 20.3 | 25.5 | 0.080 | 2.83 | 3.66 | 293.1 |
| s2 ave | 3914 | 4814 | 19.9 | 24.5 | 0.070 | 2.54 | 3.34 | 291.9 |
| s3 ave | 3931 | 4995 | 20.0 | 25.4 | 0.080 | 2.66 | 3.41 | 291.7 |
| s4 ave | 3809 | 4998 | 19.4 | 25.4 | 0.075 | 2.47 | 3.30 | 293.3 |
| s5 ave | 3991 | 4658 | 20.3 | 23.7 | 0.075 | 2.54 | 3.44 | 291.3 |
| s ave | 3928 | 4894 | 20.0 | 24.9 | 0.076 | 2.61 | 3.43 | 292.3 |

While the invention has been described in connection with what is presently considered to be the preferred embodiments, it is to be understood that the invention is not limited to the disclosed embodiments, but on the contrary, covers various modifications and equivalents included within the spirit and scope of the following claims. Therefore, persons of ordinary skill in this field are to understand that all such equivalents are included within the scope of the claims.

That which is claimed is:

1. A trussed cross-flow blower element comprising:

A. a plurality of elongated blades, each blade defining a long dimension and a short dimension, and having a curvature in said short dimension, B. at least two generally circular frame members each defining an outside circumference and a diameter, said plurality of elongated blades being attached to said at least two frame members at or near said outside circumference to form a generally cylindrical blower element defining a blower element axis, two ends, and an axial direction, C. a plurality of rod shaped truss elements, each truss element being rigidly attached near the outside circumferences of two frame members and passing through said axis to form at least three trusses extending from one end of said blower element to the other end.

2. A trussed cross-flow blower element as in claim 1 wherein said at least two frame members is at least five frame members, each having approximately the same diameter, wherein the long dimension of said blades is longer than said diameter by at least a factor of five.

3. A trussed cross-flow blower element as in claim 2 wherein said at least three trusses are three-truss radially spaced at 120° within said blower element.

4. A trussed cross-flow blower element as in claim 1 wherein said blades, said frame members and said truss elements are all comprised of nickel coated aluminum.

5. An electric discharge gas laser comprising:

A. two elongated spaced apart electrodes,

B. a cross-flow blower for circulating a gas between said electrodes said blower comprising a trussed cross-flow blower element comprising a. (1) a plurality of elongated blades, each blade defining a long dimension and a short dimension, and having a curvature in said short direction, b. at least two generally circular frame members each defining an outside circumference and a diameter, said plurality of elongated blades being attached to said at least two frame members at or near said outside circumference to form a generally cylindrical blower element defining a blower element axis, two ends, and an axial direction, c. a plurality of rod shaped truss elements, each truss element being rigidly attached near the circumference of two frame members and passing through said axis to form at least three trusses extending from one end of said blower element to the other end.

6. An electric discharge laser as in claim 5 and further comprising a gaseous gain medium comprising fluorine and a noble gas.

7. A laser as in claim 6 wherein said noble gas in chosen from a group consisting of krypton and argon.

* * * * *